Nov. 12, 1968   R. E. BOWLES   3,410,143
FLUID CONTROL DEVICE, SERIES V, TYPE 3
Filed Jan. 12, 1962                 2 Sheets-Sheet 1

INVENTOR
ROMALD E. BOWLES
BY S. J. Rotondi, A. D. Dupont,
J. E. McGee & R. C. Lucke

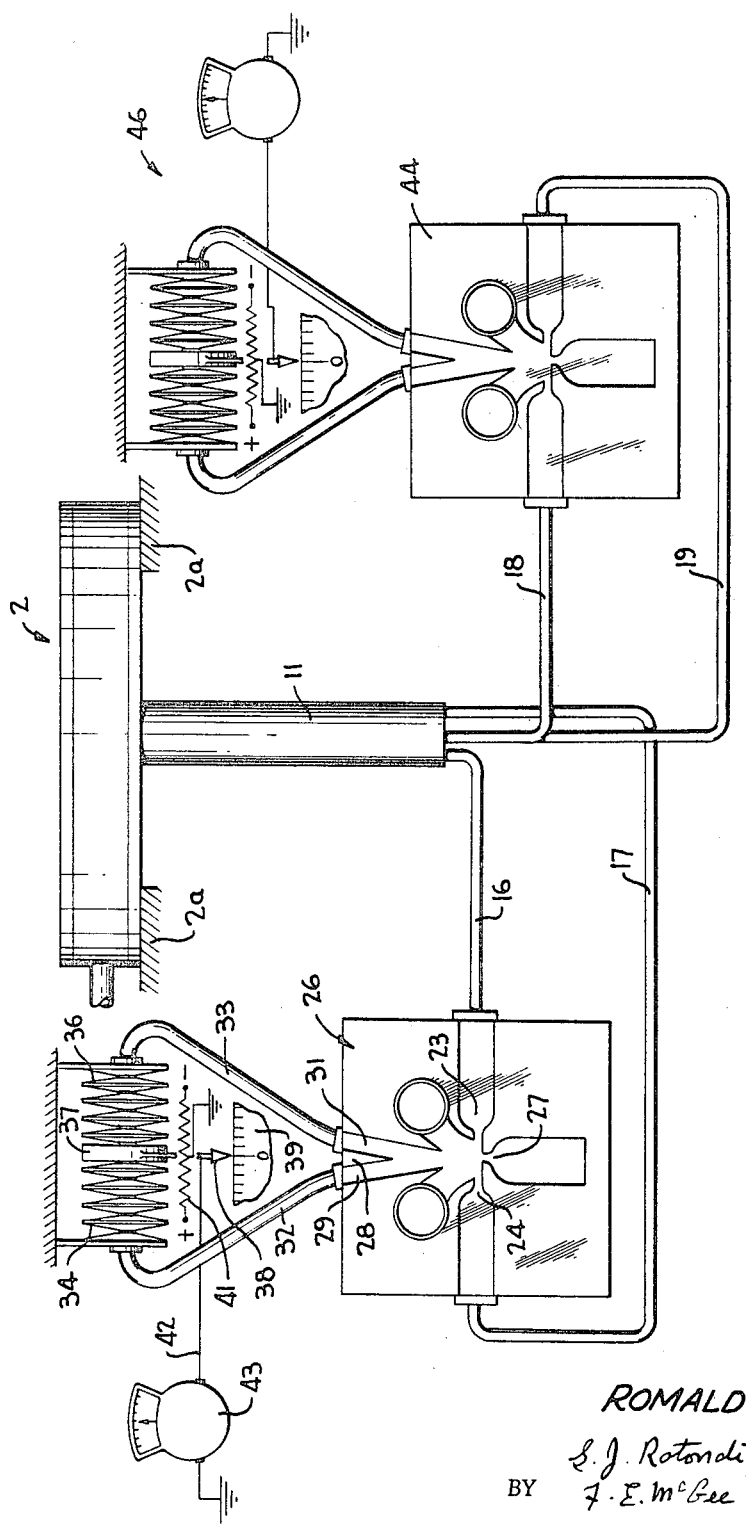

United States Patent Office 3,410,143
Patented Nov. 12, 1968

3,410,143
FLUID CONTROL DEVICE, SERIES V, TYPE 3
Romald E. Bowles, Silver Spring, Md., assignor to the United States of America as represented by the Secretary of the Army
Filed Jan. 12, 1962, Ser. No. 166,479
7 Claims. (Cl. 74—5.6)

The invention described herein may be manufactured and used by or for the Government for governmental purposes without the payment to me of any royalty thereon.

The present invention relates to rate measuring devices and more particularly to a rate measuring apparatus employing a fluid vortex amplifier to accelerate a fluid to such high rotational velocities that the apparatus exhibits gyroscopic properties.

It is known that a body of liquid will exhibit measurable gyroscopic properties if its velocity of rotation and its density are properly chosen. In a prior art device, which is known to the inventor, a body of liquid is constrained so as to provide a rate gyroscope. Specifically, the liquid is confined in an axially elongated annulus or hollow cylinder so that upon rotation of the cylinder, other than about its elongated axis, the liquid is constrained to follow movements of the cylinder and the measured processional effects are related to the rate of rotation of the cylinder. In this device, mercury is employed as the liquid and it is caused to rotate by means of a rapidly rotating magnetic field so that, in effect, the mercury serves as the rotor of an electrodynamic device. The disadvantage with the prior art device described immediately above is that the electromagnetic structure for producing the rotating magnetic field is quite bulky and cumbersome and in addition the electromagnetic drive limits the choice of fluids useable. Further, the rate at which the rotating fluid may be brought up to speed is relatively slow which is, of course, a disadvantage in any system of this type.

It is an object of the present invention to provide a gyroscopic device employing a hollow column of rapidly rotating liquid in which electromagnetic devices are not required to impart the requisite rotational velocities to the liquid.

It is another object of the present invention to provide a gyroscopic rate measuring apparatus employing a rapidly rotating mass of fluid in which the high velocity required for operation of the system is achieved by a fluid vortex amplifier.

It is another object of the present invention to provide a gyroscopic rate measuring device employing a rapidly rotating mass of fluid as its intertial element, which device requires no moving parts in addition to the mass of fluid and in which the high velocities required are achieved as a result of amplification inherent in a fluid vortex amplifier.

It is still another object of the present invention to provide a gyroscopic rate measuring apparatus in which fluid is introduced tangentially into a fluid vortex chamber and in which the rapidly rotating fluid adjacent the center of the vortex unit is drained through a hollow elongated annulus, the rapidly rotating fluid in the annulus providing a constrained mass which develops precessional pressures relates to rate of rotation when the apparatus is rotated about an axis other than the axis of the elongated column, the device also employing diametrically opposed differential static pressure measuring apparatus located in the annulus to measure precessional pressures in the fluid.

The fluid vortex amplifier of the general type utilized in the present invention is described in the copending application of Romald E. Bowles and Billy M. Horton entitled "Fluid Amplifier" filed on Aug. 11, 1960, and assigned Ser. No. 49,061 and now abandoned. The fluid vortex amplifier described in the co-pending application utilizes the flow of fluid, fluid characteristics, and fluid flow characteristics to amplify a fluid input signal. The fluid employed may be a liquid, a gas, a mixture of liquid and gas, or combinations wherein different fluids are employed in different sections of the amplifier. Fluids at cryogenic temperatures have advantages due to low viscosity characteristics.

To understand the operation of a fluid vortex amplifier, consider a circular pan of liquid provided with a small discharge hole at the bottom center. The height of the liquid in the pan results in a hydrostatic pressure tending to force the fluid out of the small centrally located discharge hole. In the case of irrotational flow; that is, completely radial flow as opposed to circumferential flow, the fluid flows radially towards and through the discharge hole. However, if a tangential component of velocity is imparted to the fluid immediately adjacent to the rim of the pan, a fluid annulus rotates as a whole about the discharge hole as an axis. It has been shown mathematically in numerous textbooks that, as this annulus shrinks towards the centrally located hole or outlet, the circumferential velocity component $V_c$ for simple rotational flow in an ideal case is related to the radial position of the annulus by the equation $$V_c = \frac{\text{constant}}{R} \quad (1)$$

where R represents the radius of the annulus at a particular time and $V_c$ represents the circumferential velocity of the fluid at this radial location. It is apparent from the above equation that, when the fluid is discharging from the pan through the small centrally located hole as fluid moves from the rim towards this hole, the circumferential velocity of the fluid increases as the radial position decreases. Under ideal conditions, if one starts with a ten-inch diameter pan discharging through a centrally located hole of .01 inch diameter, the circumferential velocity component at the discharge hole would be one thousand times the circumferential velocity component at the rim of the pan. Thus, the circumferential velocity component is amplified.

While an open pan of liquid has been employed to describe, in elementary fashion, the operation of a vortex amplifier, preferred embodiments of the invention employ a closed container or vortex chamber wherein the source of pressure causing the fluid discharge need not be derived from gravitational effects but may be due to initial pressurization of the vortex chamber or to a replenishing flow of fluid or fluids into the vortex chambers at a radius or radii different from the discharge radius. The device of the present invention employs replenishing flow to establish the vortex although it is not intended to limit the invention to a specific method of establishing vertical flow since the other methods may be employed under appropriate circumstances.

The device of the present invention may be employed to measure rate of rotation of an object about an axis and preferably is employed to simultaneously measure the rate of rotation of a missile, other airbrorne or waterborne vehicle, or other object movable in space relative to a base reference, about two of its principal axes. It is a common practice in the control of missiles, aircraft, surface vessels and submarines to employ gyroscopic devices for measuring the rotation of these vehicles about one or more of their aforesaid axes. The roll axis of a vehicle is the axis along its longitudinal center line. The pitch axis is the central axis in the horizontal plane extending perpendicular to the roll axis. The yaw axis of the vehicle is, on the other hand, the vertical axis which perpendicularly intersects the pitch and roll axes. In conventional gyroscopic systems, three rate gyroscopes may be provided, each having its axis of sensitivity aligned with a different one of the three axes of the vehicle. Upon rotation of the vehicle relative to one of these axes, its associated gyroscope is caused to precess against a mechanical constraint and the amplitude and sense of precession of this mass is a function of the degree and direction of rotation of the vehicle relative to this axis. A vast quantity of art has been built up concerning systems for utilizing this information for stabilizing the aircraft along a particular flight path. Normally, these signals are applied to several systems for operating the various control members related with each of these axes so as to return the vehicle to its initial attitude or position relative to each of the three axes or to control its turning rate.

There are two classes of gyroscopic devices in widespread use today, these being position and rate gyros. The position gyro provides information indicating the actual angular position of the vehicle relative to a desired angular position and the control mechanism utilizes these signals, usually in a servo loop, to produce counter-rotation of the vehicle until the error signal generated by the gyroscopic device is substantially reduced to zero. In a rate gyroscopic device, the rate of change of the position of the vehicle relative to its initial position is measured. This rate signal may be utilized to produce a counter-rotation torque on the vehicle corresponding to the rate of the initial rotation which, in effect, balances out the initial rate of rotation and therefore terminates rotation relative to the axis. In most gyroscopic systems employed to date, both position and rate signals are generated, it being well known in the servo art that in systems employing both of these signals, substantially stable operation of the apparatus may be obtained. The position and rate signals may be provided by distinct gyroscopic devices or each position gyroscope may be employed with a circuit having a means for differentiating the position signal and for combining the differentiated signal with the original position signal to provide all of the necessary information. Conversely, a rate gyro may be employed with a circuit providing for integration of the rate signals over predetermined time intervals, the integrated and rate signals being combined to provide a final error signal which may be employed by the apparatus to provide a substantially completely stable control system.

As indicated above, the present invention relates primarily to the latter type of system in that it provides a constrained mass of rotating liquid. In practice, one of these devices may be employed for measuring the rate of rotation of a vehicle about two of its three major axes, since the device may be located such that the axis of the rotating liquid is coaxial with one of the major axes of the craft and in consequence is perpendicular to the other two axes of the craft.

The above and still further objects, features and advantages of the present invention will become apparent upon consideration of the following detailed description of one specific embodiment thereof, especially when taken in conjunction with the accompanying drawings, wherein:

FIGURE 4 is a schematic diagram of a rate measuring apparatus incorporating the mechanism of FIGURE 1.

Figure 1:
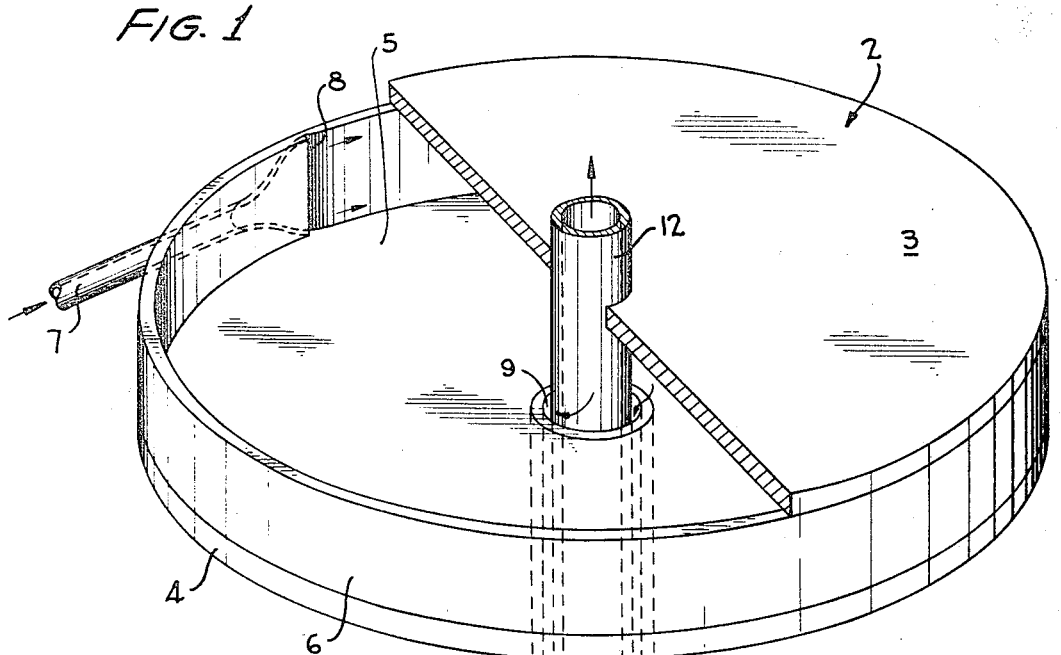
FIGURE 1 is a perspective view of the present invention.

Referring specifically to FIGURE 1 of the accompanying drawings, there is illustrated a gyroscopic rate measuring device generally designated by the reference numeral 1. The apparatus employs a fluid vortex amplifier, generally designated by the reference numeral 2, which comprises a top wall 3, a bottom wall 4, and an annular wall 6, disposed between the walls 3 and 4 and attached thereto in fluid-tight relation so as to define a vortex chamber 5. Fluid is supplied to the vortex chamber 5 through a pipe 7 connected to apertures 8 in the wall 6 which apertures are disposed tangentially to the inner periphery of the wall 6 at the point of entry into the vortex chamber 5. The fluid introduced through the pipe 7 and apertures 8 is drained from the fluid vortex amplifier through an aperture 9 which is coaxial with the axis of the wall 6. The fluid drained through the aperture 9 enters a hollow pipe 11 having disposed inwardly thereof a hollow pipe 12 of lesser outer diameter than the inner diameter of the pipe 11. In consequence, a space or annulus 13, which extends vertically as illustrated in FIGURE 1 of the accompanying drawings is provided between the pipes 11 and 12 so that the fluid draining from the vortex amplifier enters the passage 13 and is confined by the walls thereof to a hollow cylindrical column.

Figure 2:
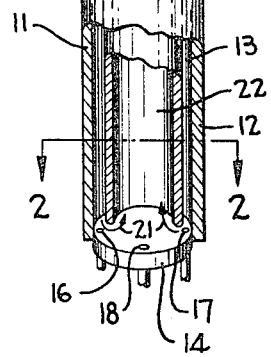
FIGURE 2 is a cross-sectional view taken along line section 2—2 of FIGURE 1.
Figure 2:
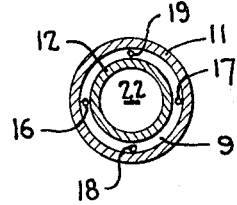

The hollow tube 11 is closed at its lower end, as viewed in FIGURE 1, by a surface 14 having formed therein four apertures 16, 17, 18 and 19, see FIGURE 2. The apertures 16 and 17 are diametrically opposed with respect to one another and a line therebetween is perpendicular to a line drawn between the apertures 18 and 19 which are also disposed at 180° with respect to one another. These apertures are employed for sensing rotation of the unit about an axis perpendicular to the axis of the tube 11 as will be described in more detail subsequently.

It will be noted that pipe 12 extends to a position close to but spaced from the end wall 14 and extends through the aperture 9 and out through the top plate 3. The pipe 12 is returned through a conduit, which is not illustrated, to the inlet side of a pump, the outlet side of which is connected to the pipe 7 to thereby provide a closed fluid system.

In operation, fluid which is introduced through the pipe 7 and apertures 8 enters the vortex chamber 5 tangentially to the wall 6 and follows the conventional vortex amplifier flow pattern to the outlet passage 9. The fluid proceeding through the passage 9 enters the hollow chamber 13 and continues to rotate along a helical path until it reaches a position adjacent the end plate 14 where the fluid follows arrows 21 and enters a center chamber 22 constituting the interior of the pipe 12.

The theory of operation of a fluid vortex amplifier is explained fully in the aforesaid co-pending patent application of Romald E. Bowles and Billy M. Horton. As described in the co-pending application, fluid velocity amplification is expressed by the following equation:

$$V_d = \frac{r_i}{r_d} \cdot V_i \quad (2)$$

where $r_i$ and $r_d$ are the radii of the inner surface of the wall 6 and the aperture 9, $V_d$ is the circumferential velocity of the fluid entering the aperture 9 and $V_i$ is the circumferential velocity of the fluid entering the vortex chamber 5 through the passage 8. Of more particular interest with respect to the present application of the apparatus is the angular rotational velocity of the fluid. The angular rotational velocity of the fluid entering the outlet 9 is related to the angular rotational velocity of the fluid entering through the passages 8 by the following equation:

$$W_d = \left(\frac{r_i}{r_d}\right)^2 \cdot W_i \cdot K \quad (3)$$

where $W_d$ and $W_i$ are the angular rotational velocities at the outlet aperture 9 and the input apertures 8, respectively, and K is a constant of the system related to the properties of the fluid. It is apparent from the above Equation 3 that if there is a ratio of the inlet to outlet radius of 10 then the ideal gain in angular rotational velocity of the fluid in passing through the vortex amplifier is 100.

Relating this phenomena to the present invention, if a fluid is introduced through the apertures 8 at a relatively high linear velocity, the angular rotational velocity of the fluid is greatly amplified in proceeding from the inlet apertures 8 to the outlet aperture 9 and exits from the vortex amplifier into the hollow column 13 and forms a column in the hollow annulus 13 at the same rotational velocity as the fluid passing through aperture 9. The fluid proceeds down, as viewed in FIGURE 1, through the hollow annulus 13 and passes under the end of and into the interior of a pipe 12. The fluid rises in the pipe 12 and may return to the inlet side of the pump. In consequence, there is provided in the annulus 13 a rapidly rotating fluid which assumes gyroscopic characteristics. Specifically, if the unit is rotated about an axis perpendicular to the axis of the pipe 12, then the fluid in the passage 13 attempts to precess in typical fashion. Actual precession of the fluid cannot occur since the fluid is restrained by the pipes or tubes 11 and 12 and therefore the system operates as a restrained; that is, a rate gyro. As a result, however, of the precessional effects, the fluid tends to develop a greater static pressure on one side of the unit and a lesser static pressure on the other side, these two locations lying along a line parallel to the axis of rotation of the unit and normal to the axis of the pipe 12.

Relating this phenomena to the structure illustrated in FIGURES 1 and 2, if the unit is rotated about an axis which passes through the outlet apertures 16 and 17, then a differential in static pressure develops between the locations of these two apertures. Also, the sense of this static pressure is a function of the direction of rotation. More particularly, if the top of the unit is rotated into the page about the aforesaid axis, then the pressure detected at the orifice 17 is greater than the pressure at the aperture 16 by an amount proportional to the rate of rotation of the unit. Conversely, if the top of the unit as viewed in FIGURE 1 is rotated outwardly from the page, then the pressure at the aperture 16 increases relative to the pressure at the aperture 17 which is decreased, and the difference in static pressures at these two apertures is a function of the rate of rotation of the unit. By employing an apparatus for measuring the differential in pressure between the diametrically opposed apertures, one may provide a system for indicating the rate of rotation of the unit or provide signals to a control system.

It should be noted that the function of the device relative to rotation about a line passing through the apertures 18 and 19 is identical with its function relative to rotation about an axis through the apertures 16 and 17 except that the differentials in pressure are detected at the former apertures; that is, the apertures 18 and 19. If, of course, rotation occurs about any axis other than the axis of the pipe 12, a differential in pressure is developed across at least one of the aforesaid pairs of apertures. If the rotation is about any other than the three mutually perpendicular axes then differentials in pressures are detected across both of the pairs of apertures 16 and 17, and 18 and 19. Since these apertures are to be connected to different measuring systems, the individual systems may compensate for or indicate the corresponding rate of rotation of the apparatus or, more specifically, indicate the extent to which rotation is occurring about each axis.

In a practical system, the axis of the tube 12 is aligned with one of the axes of a craft and rates of rotation relative to its other two axes may be detected. For instance, if it is desired to measure the rates of rotation of an aircraft or missile relative to its yaw and pitch axes, then the axis of the pipe 12 is aligned with the roll or longitudinal axis of the craft. The line through the apertures 16 and 17 may be aligned with the yaw axis of the craft and a line through the apertures 18 and 19 may be aligned with the pitch axis of the craft. Therefore, the rate of rotation about either yaw or pitch axis or about a combination of these two may be detected by the apparatus of the present invention. Correspondingly, the axis of the tube 12 may be aligned with the yaw or pitch axis and rate of rotation measured about any of the other two remaining axes. Obviously, two units such as illustrated in FIGURE 1 may be mounted upon a craft and secured thereto so as to measure rate of rotation about all three axes concurrently.

The arrangement of the pipe 12 inside of the pipe 11 is preferred since the pipe 12 then forms one of the walls of the annular chamber 12. However, the outlet pipe may be connected to the pipe 11 as a continuation thereof with a further element employed to define the annulus 12. Also, the arrangement of the apertures 16–19 in the end wall is not essential since these apertures may be located in the wall of the pipe 11. Either arrangement is acceptible.

Figure 3:
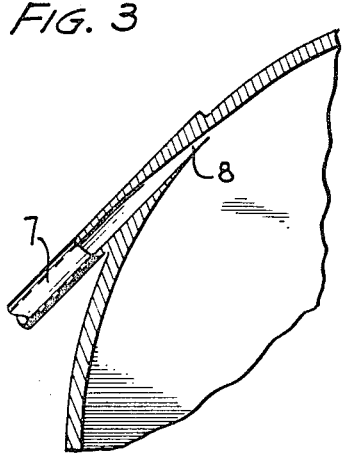
FIGURE 3 is a detailed partial cross-sectional view of the apparatus of FIGURE 1 illustrating an inlet passage to the fluid vortex amplifier.

Referring now specifically to FIGURE 4 of the present invention, there is provided a rate measuring unit 2 of the type illustrated in FIGURES 1 through 3 incorporated in a system for displaying the rates of rotation of a vehicle or craft about two of its axes. The longitudinal axis of the unit; that is, the longitudinal axis of the pipes 11, 12, etc., is aligned with one of the axes of the vehicle, the unit being mounted on the vehicle 2a so as to move therewith. The apertures 16 and 17 are aligned with one of the two remaining axes and apertures 18 and 19 are aligned with the remaining axis. The apertures 16 and 17 are connected via pipes bearing the same reference numerals to control orifices 23 and 24, respectively, of a pure fluid amplifier 26 of the type disclosed in the copending patent application of Billy M. Horton entitled "Fluid Amplifiers" filed on Oct. 26, 1959, and bearing Ser. No. 51,896.

The fluid amplifier 26 is provided with a main orifice 27 connected to a suitable source of pressurized fluid and the fluid exiting from the orifice 27 is directed along the center line of the unit toward the apex of the divider 28 defining inner sidewalls of output channels 29 and 31. In the absence of a difference in pressure between the pipes 16 and 17, the fluid issuing from the orifice 27 divides equally between the outlet passages 29 and 31 and this fluid is directed via pipes 32 and 33, respectively, to bellows 34 and 36. The bellows 34 and 36 are independently sealed units aligned coaxially with one another and having a plate 37 secured thereto and disposed between the two bellows. The plate 37 carries a pointer 38 which is read against a scale 39. The pointer 38 is conductive and is adapted to slide along a resistor 41 having its end terminals connected across a suitable source of potential. The center of the resistor 41 is connected to a suitable source of reference potential such as ground.

When the pointer 38 is centrally located on the scale 39, indicating no differential in pressure between the pipes 16 and 17, ground potential is applied to the pointer 39 which is connected via a lead 42 to a meter 43. Since the pointer 38 is grounded, under the circumstances set forth above, the meter 43 is undeflected or is at its zero position. If a differential in pressure is established between the pipes 16 and 17, then the fluid issuing through the control orifices 23 and 24 are of different velocities and due to the momentum interchange phenomena, the stream issuing from the orifice 27 is deflected in a direction depending upon which of the pipes has the greater pressure therein. Specifically, if the pressure in the pipe 16 is greater than the pressure in the pipe 17, then the fluid issuing from the orifice 27 is deflected toward the left as viewed in FIGURE 4 and a greater proportion of fluid enters the outlet orifice 29 than enters the outlet orifice 31. In consequence, the pointer 38 is deflected toward the right by an amount dependent upon the differential in pressure between the pipes 16 and 17. This deflection is indicated directly against the scale 39 and concurrently the voltage applied to the lead 42 is made negative with respect to ground and deflects the meter 43, for example, toward the right. Thus, the differential in pressure between the pipes 16 and 17 is displayed both mechanically and electrically and indicates the rate of rotation of the unit 2 relative to the axis passing through the apertures 16 and 17 of FIGURES 1 and 2.

It is apparent that the signals thus produced may be employed directly in a control system. For instance, the voltage appearing on the lead 42, since it has a magnitude and sense dependent upon the direction and rate of rotation of the missile, may be employed in a conventional aircraft or missile control system. Also, the deflection of the plate 37 may be utilized either in a mechanical, pneumatic or hydraulic autopilot system to introduce a control function therein. Further, the differentials in pressures or flow rates existing in the pipes 32 and 33 may be employed directly in a pneumatic or hydraulic control apparatus or a pure fluid control system.

Returning again to FIGURE 4, the pipes 18 and 19 are also connected to opposed control orifices of a pure fluid amplifier 44, which is substantially identical with the amplifier 26, and output fluid signals from the amplifier 44 are utilized to control the operation of an indicating system generally designated by the reference numeral 46. The unit 46 is identical with the bellows indicator and meter system described in conjunction with the fluid amplifier 26.

In summary, it is apparent that the present invention provides a gyroscopic rate measuring device which employs a rapidly rotating, confined, hollow column of fluid as a mass for detecting rates of rotation of a body about predetermined axes. The system requires no moving parts other than a conventional fluid pump and the energy required for operating the system is relatively low since the velocity of operation of the pump may be relatively low as a result of the velocity amplification achieved by means of the fluid vortex amplifier. Alternately, the fluid may be supplied by any source of fluid under pressure.

It should be noted that the apparatus of the present invention may also be utilized as a position gyro as opposed to a rate gyro. Specifically, the apparatus may be mounted in a conventional gimbal structure so that orientation displacement of the unit may occur. Conventional techniques may then be employed to detect this displacement. In order to overcome the effects of gravity operating upon the large asymmetrical vortex amplifier 2, two such units connected end-to-end in axial alignment may be employed, such a unit looking very much like the axle and wheel arrangement of a railroad car. The system would employ two units substantially identical with that illustrated in FIGURE 1 except that in such a unit it may be desirable to employ a common end wall 14.

While I have described and illustrated one specific embodiment of my invention, it will be clear that variations of the details of construction which are specifically illustrated and described may be resorted to without departing from the true spirit and scope of the invention as defined in the appended claims.

What I claim is:

1. A gyroscopic device comprising a fluid vortex amplifier including a flat cylindrical vortex chamber, an inlet opening for introducing fluid tangentially into said chamber adjacent the circumference of said chamber and an outlet opening coaxial with the center of said chamber, the radius of said outlet opening being small compared to the radius at which said inlet opening enters said chamber, and an axially elongated cylinder having an internal diameter approximately the same as the diameter of said outlet opening, said chamber and said elongated cylinder being coaxial, said elongated cylinder being connected to receive fluid directly from said outlet opening, means for confining the fluid in said elongated cylinder to an annulus adjacent the periphery of said elongated cylinder, and means for detecting the precessional effects in said fluid as a result of rotation of said device about an axis having at least a projection in a plane perpendicular to the axis of said elongated cylinder.

2. The combination according to claim 1 wherein said means for confining the fluid to an annulus comprises an end wall in said cylinder remote from said outlet opening, a hollow pipe disposed in said elongated cylinder and coaxial therewith, said pipe being of lesser external diameter than the internal diameter of said elongated annulus, said pipe having one end spaced a short distance from said end wall and extending throughout said elongated cylinder.

3. The combination according to claim 1 wherein said means for detecting comprises means for measuring the relative static pressures of said fluid in said elongated chamber at at least two diametrically opposed locations.

4. A gyroscopic rate measuring device comprising an axially elongated cylinder, an end wall for closing one end of said cylinder, a hollow cylindrical wall disposed in said elongated cylinder coaxial therewith and spaced inwardly thereof to define an elongated annulus, said cylindrical wall being spaced a short distance from said end wall, means for detecting the differential in static pressure in liquid disposed in said annulus at at least two diametrically disposed locations adjacent said end wall, a fluid vortex amplifier having a vortex chamber, an inlet passage for directing fluid into said chamber adjacent its outer periphery and tangential thereto, and an outlet opening adjacent to and coaxial with the center of said chamber, said elongated cylinder being connected to said vortex amplifier to receive fluid therefrom directly through said outlet opening.

5. The combination according to claim 4 further comprising means for detecting the differential in static pressures in said fluid at two diametrically opposed locations disposed at 90° with respect to said first-mentioned locations.

6. The combination according to claim 4 wherein said means for detecting includes a pure fluid amplifier having a power orifice, two opposed control orifices and at least two outlet passages, said means for detecting comprising an aperture at each of said two diametrically opposed locations and a pipe interconnecting each of said control orifices to a different one of said apertures.

7. A gyroscopic measuring device comprising an axially elongated cylinder, means disposed in said cylinder for defining an axially alongated, hollow annulus, means for detecting the precessional effects in fluid disposed in said annulus as a result of rotation of said device about an axis other than the axis of said cylinder, a fluid vortex amplifier having a vortex chamber, an inlet passage for directing fluid into said chamber adjacent its outer periphery and tangential thereto, and an outlet opening adjacent to and coaxial with the center of said chamber, said elongated cylinder being connected to said vortex amplifier so that fluid flows into one end of said annulus directly from said outlet opening, and means for withdrawing fluid from the other end of said annulus.

References Cited

UNITED STATES PATENTS

| | | | |
|---|---|---|---|
| 1,841,606 | 1/1932 | Kollsman | 73—504 |
| 2,949,784 | 8/1960 | Maeder | 74—5.7 |
| 2,814,487 | 11/1957 | Medkeff | 137—83 |
| 2,974,532 | 3/1961 | Goshen et al. | 73—516 |
| 2,980,363 | 4/1961 | Schonstedt | 73—504 X |
| 2,982,902 | 5/1961 | Le Gates et al. | 137—83 X |
| 2,995,939 | 8/1961 | Munk | 74—5.7 |
| 3,003,512 | 10/1961 | Ziebolz | 137—83 X |
| 3,004,547 | 10/1961 | Hurvitz | 137—83 |

C. J. HUSAR, *Primary Examiner.*